United States Patent [19]

Lin

[11] Patent Number: 5,799,371
[45] Date of Patent: Sep. 1, 1998

[54] PIVOTING JOINT

[75] Inventor: Jim Lin, Taipei, Taiwan

[73] Assignee: Tamarack Technologies Inc., Taipei, Taiwan

[21] Appl. No.: 859,412

[22] Filed: May 20, 1997

[51] Int. Cl.$^6$ .................................................. E05D 11/10
[52] U.S. Cl. ................................... 16/330; 16/342; 16/303
[58] Field of Search ......................... 16/330, 303, 304–307, 16/329, 340, 342; 403/97, 96, 91

[56] References Cited

U.S. PATENT DOCUMENTS

| 294,746 | 3/1884 | Straup et al. | 16/330 |
|---|---|---|---|
| 975,097 | 11/1910 | Wright | 16/330 |
| 5,109,571 | 5/1992 | Ohshima et al. | 16/330 |
| 5,398,378 | 3/1995 | Lin | 16/303 |
| 5,715,576 | 2/1998 | Liu | 16/342 |

*Primary Examiner*—Chuck Mah

[57] ABSTRACT

A pivoting joint connected between a first part and a second part of an instrument, permitting the first part to be turned relative to the second part and retained at one of a series of angular positions, including a first coupling member with a ratchet fastened to the first part of the instrument, a shaft mounted in an axle hole in the second part of the instrument, a sleeve and a spring holder mounted around the shaft within the axle hole of the second part of the instrument and forced by spring means to hold down the shaft, and a second coupling member fixedly mounted on the shaft and having a ratchet meshed with the ratchet of the first coupling member.

1 Claim, 3 Drawing Sheets

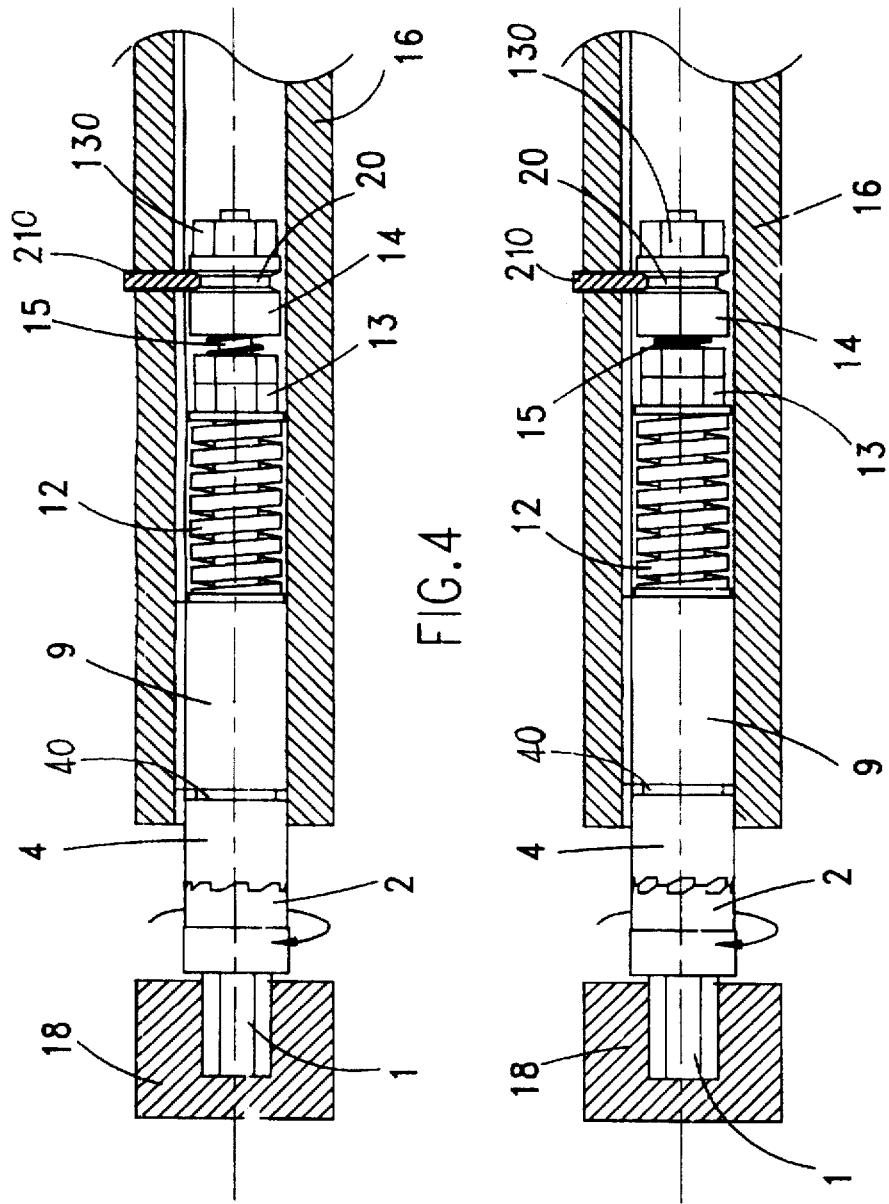

5,799,371

PIVOTING JOINT

BACKGROUND OF THE INVENTION

The present invention relates to pivoting joints, and more particularly to such a joint adapted to be connected between a first part and a second part of an instrument, for permitting the first part to be pivoted manually around one direction relative to the second part and retained at one of a series of angular positions, and for obtaining a damping effect during a reverse direction pivoting.

There is known a joint (hinge) adapted to be connected between a cover shell of an instrument and a frame thereof, for permitting the cover shell to be pivoted relative to the frame, comprised a pivot shaft having a flat mounting base at one end fixedly fastened to the cover shell of the instrument and a shaft body with an outer thread at an opposite end and a collar in the middle, a pivot holder fixedly fastened to the frame of the instrument and having a pivot hole coupled to the shaft body of the pivot shaft, a nut threaded onto the outer thread of the shaft body of the pivot shaft to secure the pivot shaft and the pivot holder together, a plurality of washers respectively mounted around the shaft body of the pivot shaft and retained between the collar of the pivot shaft and the pivot hole of the pivot holder, and two sets of rounded friction spring plates reversely mounted around the shaft body of the pivot shaft and retained between the washers. The two sets of rounded friction spring plates are forced to produce a friction force, causing the pivot shaft to be retained to the pivot holder at an angle. This structure of joint is suitable for use in a small instrument for example a notebook computer. However, because the friction force between the rounded friction spring plates cannot support a heavy load, the joint is not suitable for use in a relatively bigger instrument for example a copy machine.

SUMMARY OF THE INVENTION

The present invention has been accomplished to provide a joint which eliminates the aforesaid problem. According to the preferred embodiment of the present invention, the joint is connected between a first part and a second part of an instrument for example a copy machine, permitting the first part to be pivoted around one direction relative to the second part and retained at one of a series of angular positions, and obtaining a damping force during a reverse direction pivoting comprising: a mounting rod fixedly mounted on the first part of the instrument; a first coupling member mounted on the mounting rod and prohibited from rotary motion relative to the mounting rod, the first coupling member having a ratchet at one end; a shaft inserted into an axle hole in the second part of the instrument, the shaft comprising a tapered base, a shaft body at one end of the tapered base, and a mounting block at an opposite end of the tapered base, the shaft body having a first threaded section at one end remote from the tapered base, and a second threaded section in the middle between the first threaded section and the tapered base; a second coupling member fixedly fastened to the mounting block of the shaft, having a ratchet at one end adapted to mesh with the ratchet of the first coupling member; a sleeve sleeved onto the shaft body of the shaft within the axle hole of the second part of the instrument and stopped at the tapered base of the shaft, having a longitudinal coupling flange engaged with a longitudinal groove in the axle hole of the second part of the instrument; two first nuts respectively threaded onto the second threaded section of the shaft body of the shaft; a first spring mounted around the shaft body of the shaft and stopped between the first nuts and the sleeve, the first spring imparting a forward pressure to the sleeve, causing the sleeve to engage the tapered base of the shaft; a spring holder mounted around the shaft body of the shaft and stopped from axial movement relative to the shaft; a second spring mounted around the shaft body of the shaft within the spring holder and stopped between the spring holder and the first nuts; and a second nut threaded onto the first threaded section of the shaft body of the shaft.

BRIEF DESCRIPTION OF THE DRAWINGS

FIG. 3 is an applied view of the present invention, showing the joint connected between a frame and a cover shell and the cover shell turned forwards relative to the frame; and FIG. 4 is another applied view of the present invention, showing the cover shell turned backwards relative to the frame.

DETAILED DESCRIPTION OF THE PREFERRED EMBODIMENT

Figure 1:
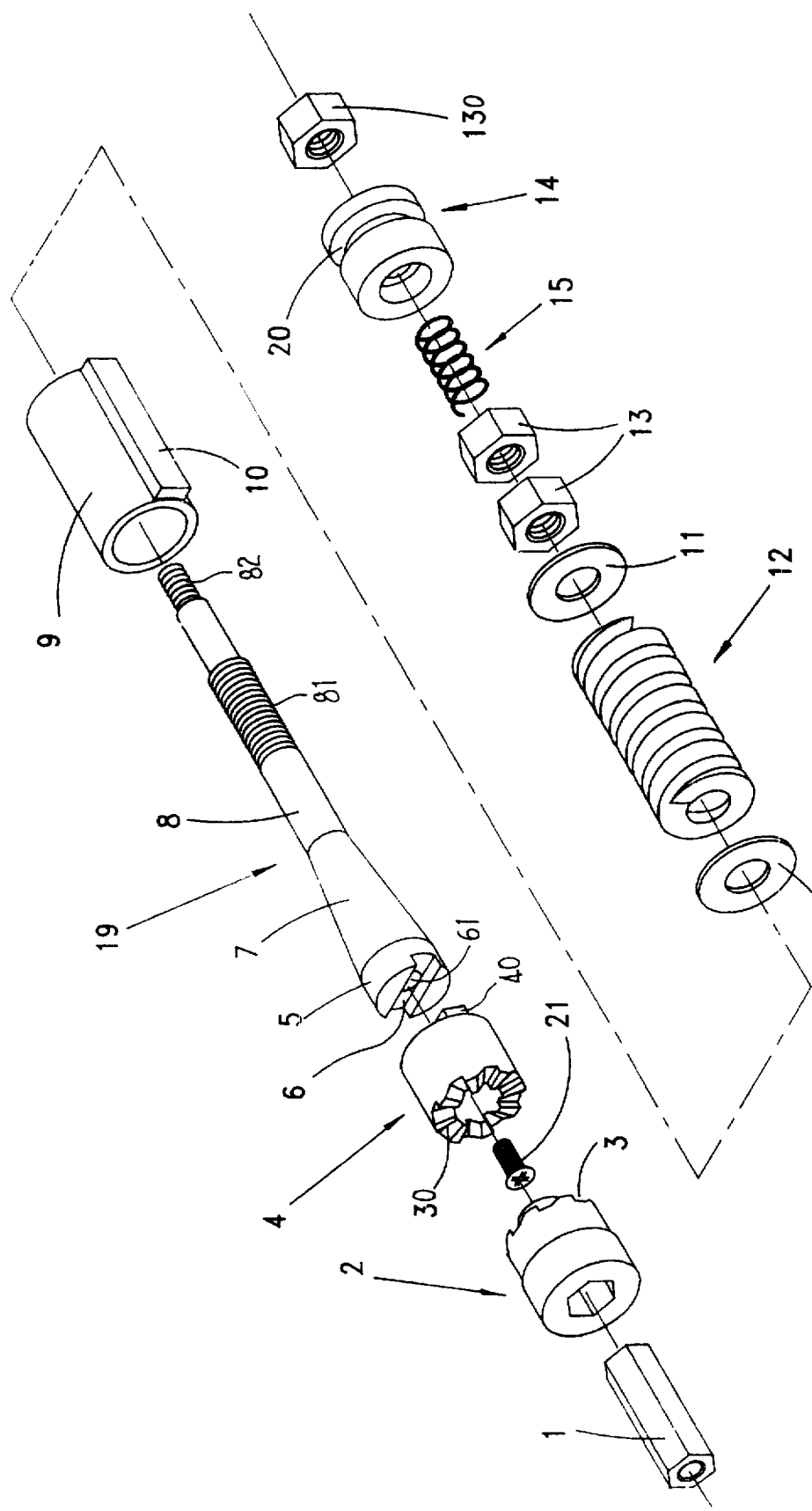
FIG. 1 is an exploded view of a joint according to the present invention.
Figure 2:
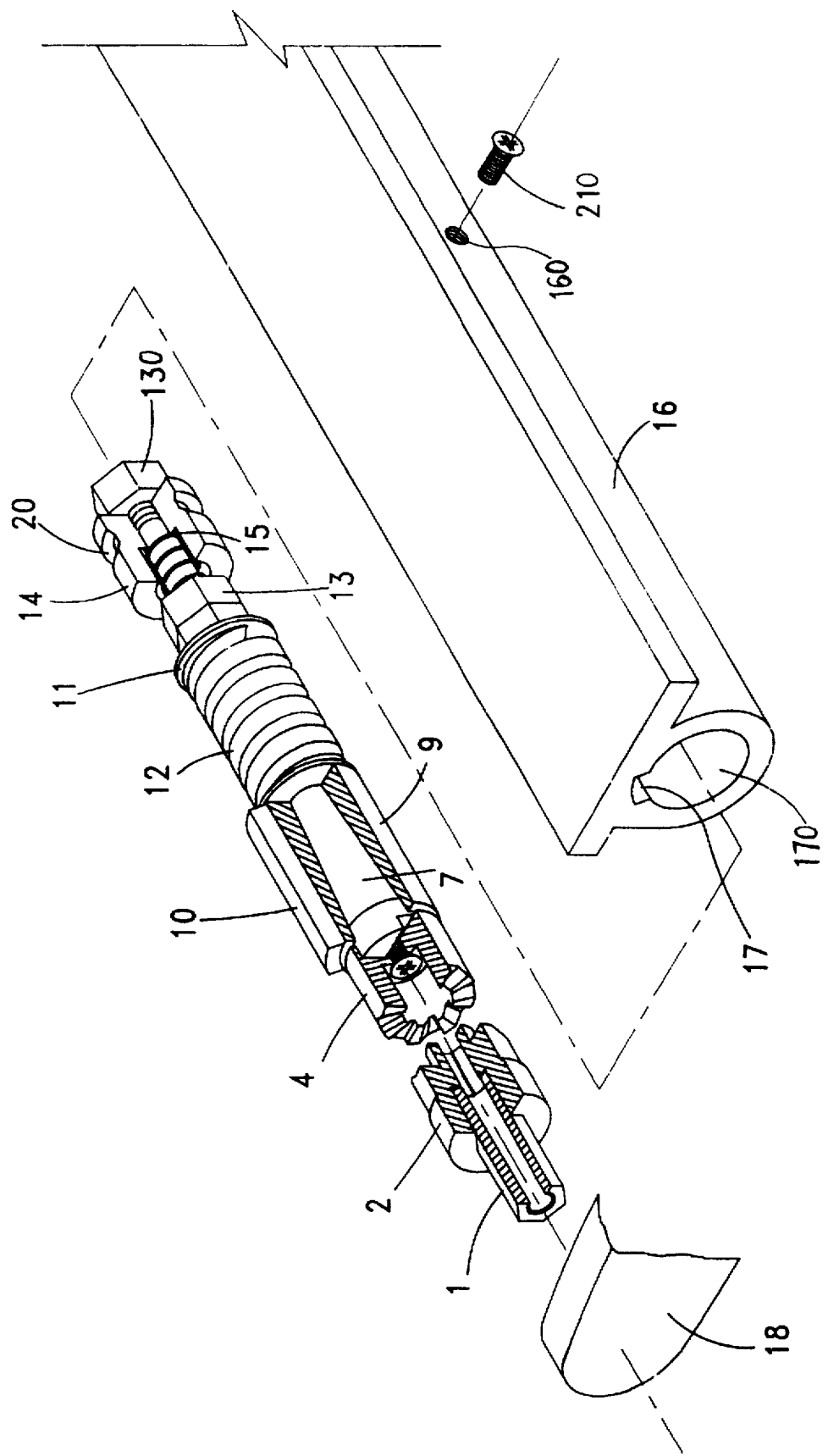
FIG. 2 is a cutaway of the present invention.

Referring to FIGS. 1 and 2, a joint in accordance with the present invention is generally comprised of a mounting rod 1, a first coupling member 2, a second coupling member 4, a shaft 19, a sleeve 9, a first spring 12, a second spring 15, and a spring holder 14. The shaft 19 comprises a tapered base 7, a shaft body 8 at one end of the tapered base 7, and a mounting block 5 at an opposite end of the tapered base 7. The mounting block 5 of the shaft 19 has a transverse groove 6, and a screw hole 61 at the center of the transverse groove 6. The shaft body 8 has a first threaded section 82 at one end remote from the tapered base 7, and a second threaded section 81 in the middle between the first threaded section 82 and the tapered base 7. The second coupling member 4 is fixedly secured to the screw hole 61 of the mounting block 5 of the shaft 19 by a screw 21, having a transverse rib 40 at one end fitted into the transverse groove 6 of the head 5 of the shaft 19, and a ratchet 30 at an opposite end. The sleeve 9 is sleeved onto the shaft 19, and stopped at the tapered base 7. The first spring 12 is mounted around the shaft body 8 of the shaft 19. Two first nuts 13 are threaded onto the second threaded section 81 to hold down the first spring 12, permitting the first spring 12 to be stopped between the first nuts 13 and the sleeve 9. Two washers 11 are respectively mounted around the shaft body 8 of the shaft 19 and retained to two opposite ends of the first spring 12. The spring holder 14 is mounted around the shaft body 8 of the shaft 19 to hold the second spring 15, permitting the second spring 15 to be retained between the spring holder 14 and the first nuts 13. A second nut 130 is threaded onto the first threaded section 82 to hold down the spring holder 14. Further, the spring holder 14 has an annular groove 20 around the periphery; the sleeve 9 has a longitudinal coupling flange 10 raised from the periphery along its length.

Referring to FIG. 3 and FIG. 2 again, when the second coupling member 4, the shaft 19, the sleeve 9, the first spring 12, the second spring 15 and the spring holder 14 are assembled, the assembly is mounted in an axle hole 170 in a frame 16, permitting the longitudinal coupling flange 10 to be forced into engagement with a longitudinal groove 17 in the axle hole 170 of the frame 16, and then a holding down screw 210 is threaded into a transverse screw hole 160 in the frame 16 and stopped at the annular groove 20 of the spring holder 14 to stop the assembly from axial movement relative to the frame 16. The mounting rod 1 is fixedly fastened to a cover shell 18. The first coupling member 2 is fastened to the mounting rod 1 and prohibited from rotary motion relative to the mounting rod 1, having a ratchet 3 adapted to mesh with the ratchet 30 of the second coupling member 4. The aforesaid frame 16 and cover shell 18 are members of parts of for example a copy machine, i.e., the frame 16 is a part of the machine base of the copy machine and the cover shell 18 is a part of the cover of the copy machine.

Referring to FIG. 4 and FIG. 3 again, the first spring 12 imparts a forward pressure to the sleeve 9, causing it to push the shaft 19 forwards (because the front end of the sleeve 9 is engaged with the periphery of the tapered base 7 of the shaft 19), and therefore the ratchet 30 of the second coupling member 4 is forced into engagement with the ratchet 3 of the first coupling member 4 to hold the cover shell 18 in position. When the cover shell 18 is lifted, less friction force exists between the ratchets 3;30 (because the teeth of each ratchet slope in one direction), therefore the first coupling member 3 is turned with the coupling rod 1 and the cover shell 18 relative to the second coupling member 4 and the frame 16 (see FIG. 3). When the hand is released from the cover shell 18, the ratchets 3;30 are meshed again to hold the cover shell 18 at the adjusted angle. When the cover shell 18 is turned inwards to the close position and the turning force surpasses the friction force between the sleeve 9 and the tapered base 7 of the shaft 19, the second coupling member 4 and the shaft 19 are turned with the first coupling member 2.

While only one embodiment of the present invention has been shown and described, it will be understood that various modifications and changes could be made thereunto without departing from the spirit and scope of the invention disclosed.

What the invention claimed is:

1. A joint connected between a first part and a second part of an instrument, permitting said first part to be turned relative to said second part and retained at one of a series of angular positions, comprising:

a mounting rod fixedly mounted on the first part of said instrument;

a first coupling member mounted on said mounting rod and prohibited from rotary motion relative to said mounting rod, said first coupling member having a ratchet at one end;

a shaft inserted into an axle hole in said second part of said instrument, said shaft comprising a tapered base, a shaft body at one end of said tapered base, and a mounting block at an opposite end of said tapered base, said shaft body having a first threaded section at one end remote from said tapered base, and a second threaded section in a middle between said first threaded section and said tapered base;

a second coupling member fixedly fastened to said mounting block of said shaft, having a ratchet at one end adapted to mesh with said ratchet of said first coupling member;

a sleeve sleeved onto said shaft body of said shaft within said axle hole of the second part of said instrument and stopped at said tapered base of said shaft, having a longitudinal coupling flange engaged with a longitudinal groove in said axle hole of said second part of said instrument;

two first nuts respectively threaded onto said second threaded section of said shaft body of said shaft;

a first spring mounted around said shaft body of said shaft and stopped between said first nuts and said sleeve, said first spring imparting a forward pressure to said sleeve, causing said sleeve to engage said tapered base of said shaft;

a spring holder mounted around said shaft body of said shaft and stopped from axial movement relative to said shaft;

a second spring mounted around said shaft body of said shaft within said spring holder and stopped between said spring holder and said first nuts; and a second nut threaded onto said first threaded section of said shaft body of said shaft.

\* \* \* \* \*